(12) United States Patent
Howse et al.

(10) Patent No.: US 8,312,742 B1
(45) Date of Patent: Nov. 20, 2012

(54) SETTLE BLOW AIR BAFFLE ASSEMBLY

(75) Inventors: Terence K. G. Howse, Toldeo, OH (US); D. Wayne Leidy, Perrysburg, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 1552 days.

(21) Appl. No.: 11/074,623

(22) Filed: Mar. 8, 2005

(51) Int. Cl.
*C03B 9/36* (2006.01)
*C03B 9/02* (2006.01)

(52) U.S. Cl. .............. 65/307; 65/229; 65/261

(58) Field of Classification Search .............. 65/307, 65/207–252, 261–267
See application file for complete search history.

(56) References Cited

U.S. PATENT DOCUMENTS

| | | | |
|---|---|---|---|
| 2,619,774 A | 12/1952 | Rowe | |
| 3,171,728 A | 3/1965 | Andersen | |
| 3,357,810 A | 12/1967 | Crouse | |
| 3,536,468 A | 10/1970 | Colchagoff | |
| 3,607,206 A | 9/1971 | Foster | |
| 3,871,856 A | 3/1975 | Trahan | |
| 3,907,533 A | 9/1975 | Jenkins | |
| 4,367,088 A | 1/1983 | Belletti | |
| 4,444,578 A | 4/1984 | Marroquin | |
| 4,466,821 A | 8/1984 | Irwin et al. | |
| 4,470,836 A | 9/1984 | Delgadillo et al. | |
| 4,525,191 A | 6/1985 | Fenton | |
| 4,610,713 A | 9/1986 | Clegg | |
| 4,704,154 A | 11/1987 | Hirt | |
| 5,266,095 A | 11/1993 | Futterknecht et al. | |
| 5,792,231 A * | 8/1998 | Schwegler | 65/207 |
| 5,858,050 A | 1/1999 | Slocum et al. | |
| 5,931,982 A | 8/1999 | Gottlieb | |
| 6,240,747 B1 | 6/2001 | Fenton et al. | |
| 6,539,751 B2 | 4/2003 | Fenton et al. | |
| 2005/0279139 A1* | 12/2005 | Howse et al. | 65/307 |

FOREIGN PATENT DOCUMENTS

| | | |
|---|---|---|
| EP | 0 118 297 A2 | 9/1984 |
| EP | 0 828 437 A1 | 4/1988 |

* cited by examiner

*Primary Examiner* — Matthew Daniels
*Assistant Examiner* — Jodi C Franklin

(57) ABSTRACT

A baffle assembly for controlling settle blow air delivery to a blank mold of a glassware forming machine, includes a baffle head, a holder and an outer ring. The baffle head has an air impervious base, a conical outer surface and an annular face. The holder has an air passage that opens at a position outside of the baffle head base. The outer ring has a first portion that slidably surrounds the holder, a second portion that surrounds the baffle head and has a conical inner surface, and a third portion for selectively engaging the mold and having an inner diameter greater than the outer diameter of the baffle head base. The baffle assembly is adapted for displacement through an intermediate position in which the baffle head separates from the outer ring so that settle blow air flows between the outer ring and the baffle head, and into the mold.

13 Claims, 2 Drawing Sheets

US 8,312,742 B1

SETTLE BLOW AIR BAFFLE ASSEMBLY

FIELD OF THE INVENTION

This invention relates generally to an apparatus for forming articles of glassware, and more particularly to a settle blow air baffle assembly for a glassware forming machine.

BACKGROUND OF THE INVENTION

Articles of glassware can be formed by depositing gobs of molten glass into a blank mold, wherein the gobs are formed into parisons or blanks which are subsequently transferred to a final mold where they are blow molded into their desired final shape. After depositing the gobs of molten glass into the cavities of a blank mold, it is known to supply air under pressure to the blank mold to settle the gobs in the blank mold. In a blow and blow machine wherein the gobs are blow molded to form blanks or parisons, settling the gobs within the blank mold can help form the finish of the article of glassware, position the gob relative to a blow pin of the blank mold, and improve distribution of the molten glass material within the mold cavity.

SUMMARY OF THE INVENTION

A baffle assembly for controlling passage of settle blow air to a blank mold of a glassware forming machine includes a baffle head, a holder and an outer ring. The baffle head has an air impervious base, a conical outer surface and an annular face. The holder is coupled to the baffle head base and has an air passage that opens at a position outside of the baffle head base. The outer ring has a first portion that slidably surrounds the holder, a second portion that surrounds the baffle head and has a conical inner surface, and a third portion for selectively engaging the mold and having an inner diameter greater than the outer diameter of the baffle head base. The baffle assembly is adapted for displacement against the end of the blank mold through an intermediate position in which the third portion of the outer ring engages the blank mold and the baffle head separates from the outer ring so that settle blow air can flow from the air passage between the outer ring and the baffle head, and into the mold. The baffle assembly is moveable to an end position in which the annular face on the baffle head engages the mold.

In a retracted position of the baffle head, the conical outer surface of the baffle head is in facing engagement with the conical inner surface of the inner ring and provides a seal that substantially prevents air flow between the engaged surfaces. This permits a supply of pressurized air to be maintained upstream of the baffle head. Accordingly, when the outer ring engages the blank mold and the baffle head is displaced away from the outer ring, pressurized air immediately is fed between the baffle head and outer ring and into the blank mold cavity. The baffle head preferably includes channels on its conical outer surface to permit passage of some air between the baffle head and conical inner surface of the outer ring when they are engaged which desirably provides some cooling of the baffle head when it is in its retracted position. The baffle head also preferably includes channels on its annular face for venting the blank mold through these channels and the air passage in the holder when the baffle head is engaged with the blank mold.

BRIEF DESCRIPTION OF THE DRAWINGS

These and other objects, features and advantages of the present invention will be apparent from the following detailed description of the preferred embodiments and best mode, appended claims and accompanying drawings in which:

DETAILED DESCRIPTION OF THE PREFERRED EMBODIMENTS

Figure 1:
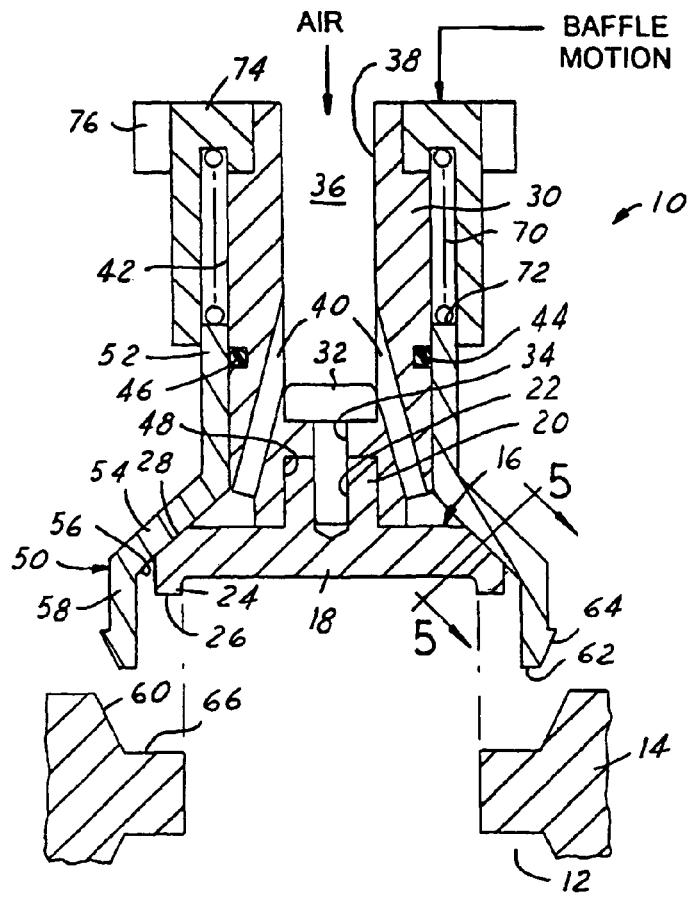
FIG. 1 is a cross-sectional view of one presently preferred embodiment of a baffle assembly for controlling delivery of settle blow air to a blank mold of a glassware forming machine, with the baffle assembly shown in a fully retracted position.
Figure 2:
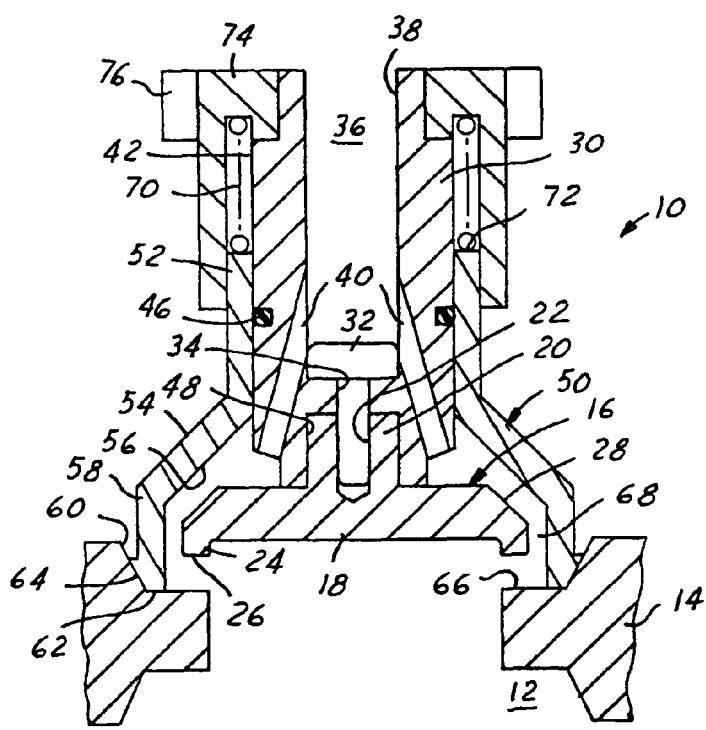
FIG. 2 is a cross-sectional view illustrating the baffle assembly in an intermediate position.
Figure 3:
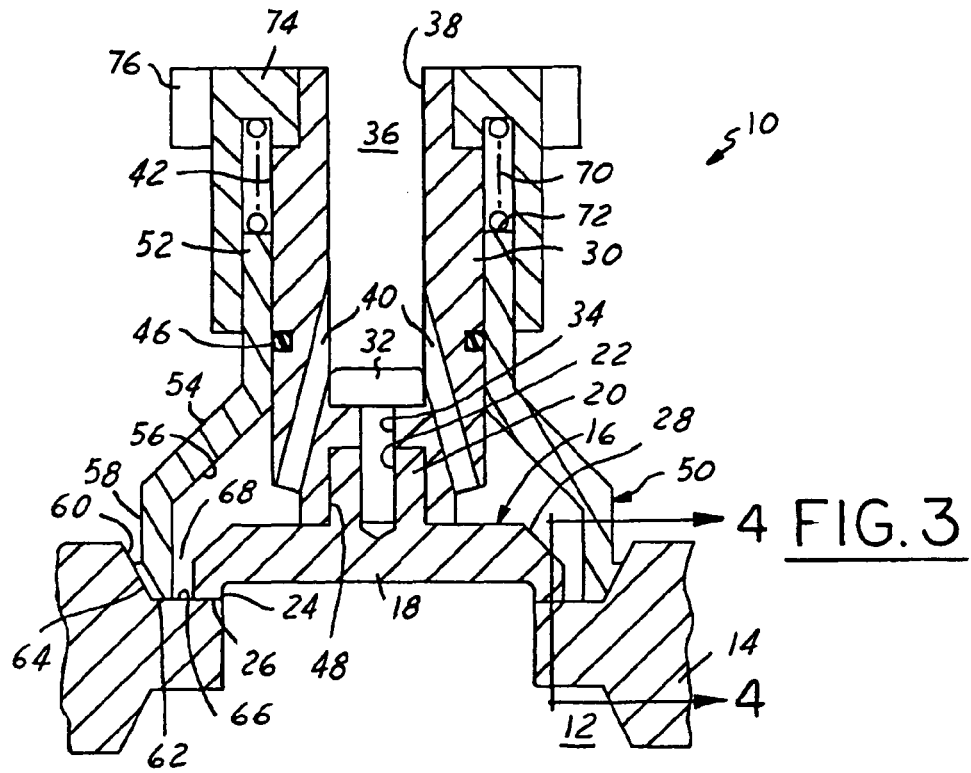
FIG. 3 is a cross-sectional view illustrating the baffle assembly in a fully advanced position.

Referring in more detail to the drawings, FIGS. 1-3 illustrate a baffle assembly 10 that controls the delivery of settle blow air into a cavity 12 of a blank mold 14 in a glassware forming machine. The settle blow air is fed into the blank mold cavity 12 and onto a gob of molten glass within the cavity 12 prior to blow molding the gob into a pairson or blank during the forming of an article of glassware.

Figure 4:
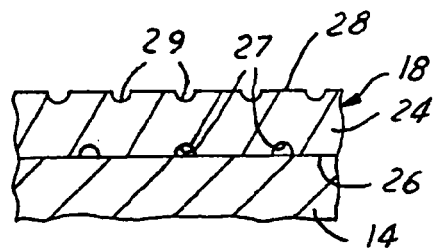
FIG. 4 is a fragmentary cross-sectional view taken generally along line 4-4 in FIG. 3.
Figure 5:
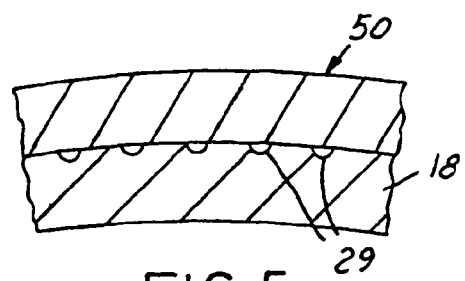
FIG. 5 is a cross-sectional view taken generally along line 5-5 in FIG. 1.

The baffle assembly 10 includes a baffle head 16 that is preferably generally circular and has a base 18 impervious to air. An annular wall 20 extends from one side of the base 18 and preferably includes a threaded blind bore 22. An annular lip 24 extends from the other side of the base 18 and defines an annular face 26 of the baffle head 16 that is preferably generally planar. As shown in FIG. 4, channels 27 are preferably formed in the annular face 26. The baffle head 16 also includes a conical outer surface 28. As best shown in FIG. 5, channels 29 are preferably formed in the conical outer surface 28.

The baffle assembly 10 also includes a holder 30 that is coupled to the base 18 of the baffle head 16 such as by a bolt 32 extending through a bore 34 in the holder 30 and into the threaded blind bore 22 in the baffle head 16. The holder 30 is preferably generally cylindrical and includes a counterbore 36 preferably coaxially aligned with the bore 34 and defining an inner surface 38 of the holder 30. At least one air passage 40 extends from the inner surface 38 to the outer surface 42 of the holder 30. An annular groove 44 in the outer surface 42 of the holder 30 may be provided to receive a seal 46, such as an O-ring, to prevent leakage of air between the holder 30 and an adjacent component in the assembly 10. A second counterbore 48 in the holder 30 may be formed to receive and surround the wall 20 extending from the baffle head base 18 to provide a more secure connection between the holder 30 and baffle head 16. Preferably, a plurality of air passages 40 are provided in the holder 30 with each air passage 40 communicating the outer surface 42 of the holder 30 with the counterbore 36. In one presently preferred form, as shown in FIGS. 1-3, the air passages 40 may extend at an acute included angle relative to an axis of the counterbore 36 so that the air passages 40 open into the counterbore 36 above the bolt 32 and extend radially outwardly toward the outer surface 42 of the holder 30 and axially toward the baffle head 16. The holder 30 can be advanced by any suitable actuator including, for example and without limitation, a pneumatic actuator or mechanical actuator such as a press or piston.

The baffle assembly 10 also includes an outer ring 50 with a first portion 52 that slidably surrounds the holder 30, a second portion 54 that surrounds the baffle head 16 and has a conical inner surface 56, and a third portion 58 adapted to engage an annular, tapered or frustoconical locating surface 60 of the blank mold 14. In one presently preferred form, the first portion 52 of the outer ring 50 is generally cylindrical and is closely received adjacent to the outer surface 42 of the holder 30. Desirably, the seal 46 carried by the holder 30 provides a generally air tight seal between the holder 30 and the outer ring 50. From the first portion 52, the outer ring 50 preferably tappers generally radially outwardly providing a frustoconical second portion 54 including the conical inner surface 56. In the presently preferred embodiment as shown in the drawings, the outer ring 50 transitions from the second portion 54 to a generally cylindrical third portion 58 that includes an annular end face 62 and a generally frustoconical side face 64. The end face 62 is preferably generally planar and is adapted to engage a generally planar seat 66 surface of the blank mold 14. The side face 64 is preferably frustoconical and formed at an angle complementary to the angle at which the annular locating surface 60 in the mold 14 is formed. Accordingly, as shown in FIGS. 2 and 3, the outer ring 50 preferably engages the mold 14 with both its side surface 64 to help locate the baffle assembly 10 relative to the mold 14, and at its end face 62 ensuring the baffle assembly 10 is fully seated on the mold 14. In the presently preferred form, the third portion 58 of the outer ring 50 has an inner diameter which is greater than the outer diameter of the baffle head base 18 providing a gap 68 between them as best shown in FIGS. 2 and 3.

A spring 70 is preferably provided between an end 72 of the outer ring 50 opposite its end face 62 and a spring retainer 74 that may be held on the holder 30 by a suitable clamp 76. The spring 70 yieldably biases the outer ring 50 toward the mold 14 and to an extended position over the baffle head 16 in which the conical outer surface 28 of the baffle head 16 abuts and is in facing engagement with the conical inner surface 56 of the outer ring 50, as shown in FIG. 1. As shown in FIGS. 2 and 3, the spring 70 permits relative movement between the holder 30 and the outer ring 50, and more particularly, when the outer ring 50 is engaged with the mold 14, the holder 30 may be advanced towards the mold 14 and relative to the outer ring 50. The spring 70 is preferably a coil spring, although other springs or biasing mechanisms can be used including, for example, compressed gas.

In use, the baffle assembly 10 begins in a fully retracted position, as shown in FIG. 1. In this position, the baffle assembly 10 is removed from the blank mold 14 and the outer ring 50 is biased by the spring 70 so that its conical inner surface 56 engages the conical outer surface 28 of the baffle head 16. The engagement of the conical surfaces 28, 56 provides a seal that substantially prevents air flow between the engaged conical surfaces 28, 56. Accordingly, air pressure can build upstream of the baffle head base 18 to provide a supply of pressurized air immediately available when the baffle head 16 and outer ring 50 are separated. Desirably, in one presently preferred form, the channels 29 formed in the conical outer surface 28 of the baffle head 16 permit a controlled air flow therethrough that provides cooling of the baffle head 16 and outer ring 50, while still permitting the build up of pressurized air upstream of the baffle head 16. The channels 29 are preferably constructed and arranged to provide a significant restriction to air flow thereby permitting a limited cooling air flow therethrough while a desired pressure is maintained upstream of the baffle head 16.

When it is desired to deliver settle blow air into the cavity 12 of the blank mold 14, the baffle assembly 10 is advanced toward the mold 14. The outer ring 50 initially engages the locating surface 60 of the blank mold 14, and the end face 62 of the outer ring 50 engages the seat 66 formed in the blank mold 14. Continued advancement of the holder 30 toward the blank mold 14 displaces the baffle head 16 relative to the outer ring 50, and unseats the conical outer surface 28 of the baffle head 16 from the conical inner surface 56 of the outer ring 50. Because the pressure of the air upstream of the baffle head 16 was permitted to build up due to the substantial seal between the conical surface 28 of the baffle head 16 and the outer ring 50, a supply of pressurized settle blow air immediately is fed through the gap 68 or space between the baffle head 16 and the outer ring 50 and into the cavity 12 of the blank mold 14.

Continued advancement of the holder 30 toward the blank mold 14 engages the annular face 26 of the baffle head 16 with the seat 66 of the mold 14 substantially closing the mold cavity 12, as shown in FIG. 3. At this stage the application of settle blow air into the mold cavity 12 is essentially terminated. Air trapped within the mold cavity 12 between the baffle head 16 and the gob of molten gas is vented through the channels 27 formed in the annular face 26 of the baffle head 16 as the gob of glass is blown into parison or blank form.

Desirably, the face-to-face contact between the conical outer surface 28 of the baffle head 16 and the conical inner surface 56 of the outer ring 50 permits air pressure to build up within the baffle assembly 10 and thereby provides an immediately available supply of pressurized settle blow air. This supply of pressurized air is generally immediately available at substantially full pressure, rather than having to build-up to full pressure when delivery of air into the mold cavity begins. This reduces the cycle time for application of settle blow air to the mold cavity 12, and hence, decreases the cycle time and improves the efficiency of forming articles of glassware. Further, cooling of the baffle assembly 10 is preferably provided through the same surface at which the seal substantially preventing air flow between the baffle head 16 and outer ring 50 is provided.

Those of ordinary skill in the art will recognize that the preceding description has been provided in terms of description rather than limitation. While presently preferred embodiments or forms of the invention have been disclosed herein, modifications and substitutions can be made without departing from the spirit and scope of the invention set forth in the appended claims. For example, without limitation, while channels 29 have been disclosed as being preferably formed in the outer surface 28 of the baffle head 16 to permit controlled airflow between the baffle head 16 and outer ring 50, these channels could be formed in only the outer ring 50, or in both the outer ring 50 and the baffle head 16. Likewise, while channels 27 have been disclosed in the annular face 26 of the baffle head 16, such channels could be formed in either or both of the baffle head 16 and the mold 14, as desired to permit venting of the air trapped within the mold cavity 12 after application of the settle blow air to the mold cavity 12. Still other modifications and substitutions will be apparent to those skilled in the art in view of this disclosure.

The invention claimed is:

1. A baffle assembly for controlling delivery of settle blow air to a glassware blank mold of a glassware forming machine, said glassware blank mold having a seat and a locating surface, said baffle assembly including:
   a holder having at least one air passage,
   a baffle head having an air-impervious base coupled to said holder, an outer sealing surface, and an annular face engageable with the seat of the blank mold,
   an outer ring having a first portion movably mounted on said holder, a second portion extending radially outward from said first portion with an inner sealing surface engageable with said outer sealing surface of said baffle head, and a third portion extending from said second portion and engageable with the locating surface of the blank mold, and said at least one air passage in said holder opening upstream of said outer sealing surface of said baffle head and said inner sealing surface of said outer ring, a spring to yieldably bias said outer ring along said holder toward the blank mold and toward an extended position over said baffle head in which said inner sealing surface of said outer ring engages said outer sealing surface of said baffle head to block air flow from said at least one air passage and permit air pressure to build upstream of said baffle head to provide an immediately available supply of pressurized settle blow air upstream of said baffle head, said baffle assembly being movable between a retracted position in which said baffle assembly is spaced from the seat of the blank mold and an end position in which said annular face on said baffle head engages the seat of the blank mold, wherein initial advancement of said baffle assembly from said retracted position toward the blank mold brings said third portion of said outer ring into initial engagement with the locating surface of the blank mold while said sealing surfaces remain engaged, continued advancement of said baffle assembly toward the blank mold displaces said baffle head relative to said outer ring so that said sealing surfaces separate to open a gap between said sealing surfaces and permit flow of said immediately available supply of pressurized settle blow air through said gap and into the blank mold, and further advancement of said holder toward said blank mold and said end position brings said annular surface of said baffle head into contact with the seat of the blank mold to terminate airflow from said baffle assembly into the blank mold.

2. The baffle assembly set forth in claim 1 wherein said sealing surfaces are conical and said baffle head includes channels on said conical outer sealing surface to permit limited air flow between said conical sealing surfaces while permitting build up of pressurized air upstream of said baffle head, to provide cooling of said baffle head and said outer ring when said conical sealing surfaces are engaged.

3. The baffle assembly set forth in claim 1 wherein said baffle head includes channels on said annular face for venting the blank mold through said at least one air passage in said holder.

4. The baffle assembly set forth in claim 3 wherein said baffle head includes a peripheral lip that terminates in said annular face.

5. The baffle assembly of claim 3 wherein said channels extend radially in the annular face.

6. The baffle assembly set forth in claim 1 wherein said holder includes a plurality of angularly spaced air passages.

7. The baffle assembly set forth in claim 1 wherein said annular face of said baffle head is generally planar and adapted to be selectively engaged with said seat.

8. The baffle assembly set forth in claim 1 wherein said third portion of said outer ring includes an annular and planar end face that selectively engages the seat and the locating surface of the blank mold.

9. The baffle assembly of claim 1 wherein the blank mold locating surface is annular and tapered and said outer ring includes a generally frustoconical side face adapted to be received in said locating surface to ensure proper location of the baffle assembly relative to the blank mold.

10. The baffle assembly of claim 1 wherein said sealing surfaces of said baffle head and said outer ring are conical and are disposed at complementary angles providing a substantially air tight seal between said conical sealing surfaces when engaged.

11. The baffle assembly of claim 10 which also includes channels formed in at least one of the conical outer sealing surface and the conical inner sealing surface permitting a limited flow of air between the conical sealing surfaces even when said conical sealing surfaces are engaged while permitting build up of pressurized air upstream of said baffle head, to provide cooling of said baffle head and said outer ring.

12. The baffle assembly of claim 1 wherein said holder and said baffle head are displaceable relative to the outer ring against the bias of the spring.

13. The baffle assembly of claim 1 which also includes a retainer carried by the holder and wherein said spring is disposed between said retainer and said outer ring.

* * * * *